United States Patent
Wood et al.

(10) Patent No.: US 6,497,546 B2
(45) Date of Patent: Dec. 24, 2002

(54) GRAIN WAGON HAVING AN UNLOADING CONVEYOR WITH A MOVEABLE DISCHARGE SPOUT CONTROLLED FROM A TOW VEHICLE

(75) Inventors: James E. Wood, Ft. Recovery, OH (US); Scott M. Grieshop, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 0 days.

(21) Appl. No.: 09/874,092

(22) Filed: Jun. 6, 2001

(65) Prior Publication Data

US 2001/0026755 A1 Oct. 4, 2001

Related U.S. Application Data

(63) Continuation-in-part of application No. 09/500,563, filed on Feb. 9, 2000, now Pat. No. 6,296,435.

(51) Int. Cl.[7] .................................................. B60P 1/40
(52) U.S. Cl. ........................ 414/523; 414/335; 414/505; 198/536
(58) Field of Search ................................ 414/505, 523, 414/335; 198/536

(56) References Cited

U.S. PATENT DOCUMENTS

| | | | | |
|---|---|---|---|---|
| 608,585 A | * | 8/1898 | Dentler | ........................ 193/16 |
| 1,798,231 A | | 3/1931 | Thiemann | |
| 1,847,433 A | | 3/1932 | Krause | |
| 2,563,432 A | | 8/1951 | Sterler | |
| 2,724,516 A | | 11/1955 | Weishaar | |
| 2,748,958 A | * | 6/1956 | Moser | ........................ 414/335 |
| 2,767,963 A | * | 10/1956 | Ringen et al. | ............... 366/133 |
| 3,144,928 A | | 8/1964 | Roloson | |
| 3,844,433 A | * | 10/1974 | Laajala | .................... 414/523 X |
| 4,074,802 A | * | 2/1978 | Hudis | .......................... 198/315 |
| 4,184,274 A | * | 1/1980 | Vohl | ............................ 37/261 |
| 4,415,303 A | | 11/1983 | Westendorf | |
| 5,167,581 A | * | 12/1992 | Haag | .......................... 460/114 |
| 5,340,265 A | * | 8/1994 | Grieshop | .................... 414/526 |
| 5,343,995 A | | 9/1994 | Scarrow | |
| 5,575,316 A | | 11/1996 | Pollklas | |
| 5,979,151 A | * | 11/1999 | Sanders et al. | ................. 56/60 |

FOREIGN PATENT DOCUMENTS

JP   58 161629   * 9/1983   .................. 414/505

* cited by examiner

Primary Examiner—Steven A. Bratlie
(74) Attorney, Agent, or Firm—Jacox, Meckstroth & Jenkins

(57) ABSTRACT

A grain wagon includes a wheel supported frame on which is mounted a hopper or container for receiving grain, and the wagon is pulled by a tow vehicle or tractor. An inclined discharge auger conveyor has an outer section which folds between a stored position and an operating position projecting upwardly and forwardly and laterally outwardly from the container. The outer auger section has a pivotal discharge spout with a pivotal internal baffle, and the spout is actuated by a double acting hydraulic cylinder controllable through hydraulic lines from the cab of the tractor so that the tractor operator may fully load and "top off" the grain within an adjacent semi-trailer as the tractor operator pulls the wagon along the side of the semi-trailer. In one embodiment, the outer section of the auger conveyor has an outer telescopic housing extension which carries the discharge spout and extends and retracts automatically with folding of the outer auger conveyor section.

5 Claims, 3 Drawing Sheets

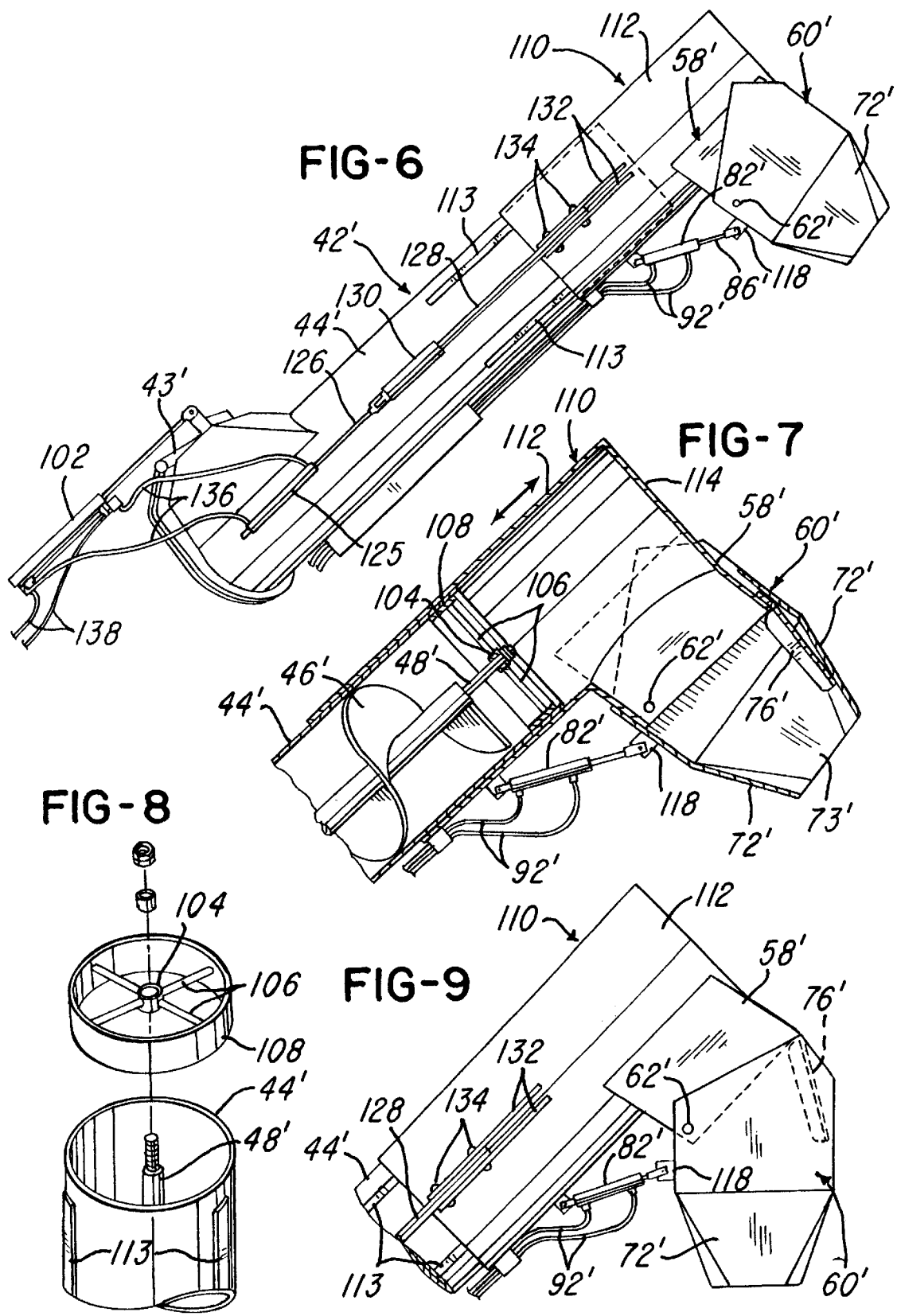

GRAIN WAGON HAVING AN UNLOADING CONVEYOR WITH A MOVEABLE DISCHARGE SPOUT CONTROLLED FROM A TOW VEHICLE

RELATED APPLICATION

This application is a continuation-in-part of application Ser. No. 09/500,563, filed Feb. 9, 2000 now U.S. Pat. No. 6,296,435.

BACKGROUND OF THE INVENTION

The present invention is directed to an improved grain wagon of the general type disclosed in U.S. Pat. No. 5,340,265 which issued to the Assignee of the present invention and the disclosure of which is incorporated by reference. As generally disclosed in this patent, a grain receiving hopper or container is mounted on a wheel supported frame having a hitch connected to a tow vehicle or tractor. The grain wagon includes an inclined grain discharge auger having an outer section pivotally connected to a lower section and moved by a hydraulic cylinder between a stored position adjacent the front wall of the container and a forwardly and laterally outwardly projecting position for unloading grain from the container. The outer section of the inclined auger has a downwardly projecting discharge spout through which the grain is discharged from the auger into a semi-trailer located adjacent the grain wagon.

It has been known to connect a flexible discharge tube to an auger discharge spout so that the tube depends from the spout. As grain is unloaded from the grain wagon into an adjacent open top semi-trailer, a person standing on the trailer or on the grain within the trailer can move the flexible tube so that the semi-trailer may be fully loaded and "topped-off" by rounding the grain at the top of the semi-trailer. However, the maneuvering of the flexible tube requires an additional person on or within the semi-trailer or the operator of the tractor must step down and climb up on the semi-trailer. Such additional person or operator time adds to the cost of transferring the grain from the wagon to the trailer.

It has been found desirable to provide a grain wagon with a foldable unloading auger such as disclosed in above-mentioned U.S. Pat. No. 5,340,265 and wherein the auger has a moveable and power operated discharge spout on its outer or upper end portion. It is also desirable for the spout to have sufficient movement in order to discharge the grain from the auger back and forth across the entire width of the semi-trailer in order for the trailer to be fully loaded with grain and for the grain to be rounded at the top of the semi-trailer. It is also desirable for the discharge spout to have sufficient movement in order to correct for an unloading position due to the tractor operator error in spacing the grain wagon either too close or too far away from the semi-trailer during his approach to the semi-trailer. It has further been found desirable for the power operated moveable or pivotal discharge spout to be controllable by the towing tractor operator so that as the operator moves the tractor and grain wagon along the length of the semi-trailer in incremental steps, the operator may also conveniently and precisely direct the grain back and forth across the width of the semi-trailer.

Such a structure enables the unloading auger to be efficiently operated at maximum speed in order to minimize the time required to transfer the grain from the grain wagon to the semi-trailer and to load the semi-trailer uniformly along its length. While it is known to have pivotable or adjustable discharge spouts or deflectors on grain conveyors, for example, as disclosed in U.S. Pat. No. 1,798,231, U.S. Pat. No. 1,847,433 and U.S. Pat. No. 5,343,995, no one has previously recognized the significant advantages of having a grain wagon discharge auger with a power operated moveable discharge spout which is remotely controllable by the operator of the towing tractor.

SUMMARY OF THE INVENTION

The present invention is directed to an improved wheel supported grain wagon with an inclined unloading auger having a moveable or pivotal discharge spout which is remotely moveable back and forth by the operator of the towing vehicle or tractor. Thus the present invention enables the operator of the tractor to direct the grain precisely while unloading the grain from the grain wagon into an adjacent semi-trailer as the wagon is pulled along the length of the trailer. As a result, a grain wagon constructed in accordance with the present invention provides for efficiently and quickly unloading the grain wagon into a semi-trailer with only one operator and in a manner that assures that the semi-trailer is fully filled with the grain and the grain is uniformly rounded or "topped off" along the top of the semi-trailer.

In accordance with a preferred embodiment of the invention, a wheel supported grain wagon is connected to a towing vehicle or tractor and includes a hopper or container with an inclined discharge auger having a folding outer section which pivots between a stored position adjacent the container and an extended operable position projecting upwardly and laterally outwardly from the container. The outer end portion of the auger or a telescopic auger housing extension is provided with a fixed discharge spout section which supports a pivotal discharge spout section and a pivotal baffle member within the pivotal spout section. The pivotal spout section has a tapered lower end portion, and a double acting fluid cylinder extends between the fixed spout section and the pivotal spout section. Hydraulic lines extend from the cylinder down the auger and forwardly to the standard hydraulic coupler fittings at the rear of the tractor which tows the grain wagon. Thus the operator of the tractor may positively move the pivotal discharge spout section back and forth as the operator pulls the grain wagon slowly or in incremental steps along the length of the open top semi-trailer which receives the grain from the auger. As a result, the operator of the towing tractor may selectively direct the grain from the auger into the semi-trailer and back and forth across the width of the trailer to assure optimum loading of grain within the trailer. The telescopic auger housing extension is extended and retracted by a double acting hydraulic cylinder connected to operate in unison with the hydraulic cylinder which folds the outer auger section between its extended position and its stored position.

Other features and advantages of the invention will be apparent from the following description, the accompanying drawings and the appended claims.

BRIEF DESCRIPTION OF THE DRAWINGS

FIG. 6 is an elevational view of a foldable outer auger section constructed in accordance with another embodiment of the invention and having an axially moveable auger housing extension supporting the controllable discharge spout shown in FIGS. 1–5;

FIG. 7 is a fragmentary section of the auger housing extension shown in FIG. 6;

FIG. 8 is an exploded perspective view of a portion of the auger housing shown in FIGS. 6 & 7; and FIG. 9 is an elevational view of the auger housing extension shown in FIGS. 6 & 7 and with the discharge spout in a downwardly projecting position.

DETAILED DESCRIPTION OF THE PREFERRED EMBODIMENTS

Figure 1:
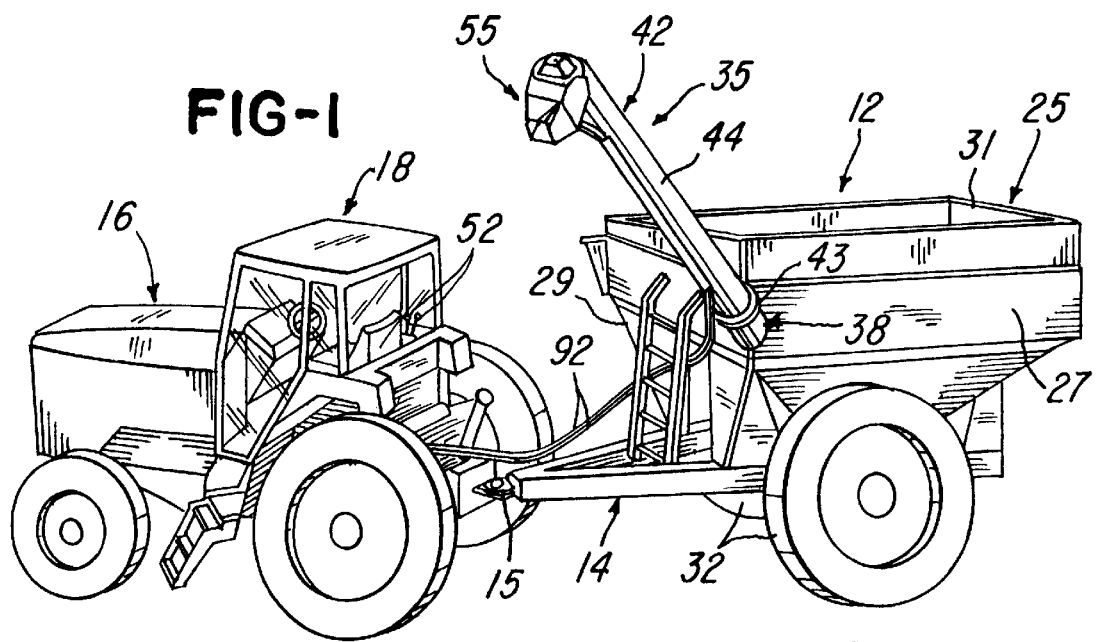
FIG. 1 is a perspective view of a grain wagon connected to a tow tractor and incorporating a grain unloading auger with a moveable discharge spout assembly controlled by the tractor operator in accordance with the invention.

FIG. 1 shows a grain wagon 12 incorporating the improvement of the invention and having a support frame 14 with a hitch 15 for pivotally connecting the frame to a tow vehicle or tractor 16 having a cab 18 for enclosing a tractor operator. The frame 14 supports a hopper or container 25 which has opposite side walls 27, a front wall 29 and a back wall 31. All of the walls have lower portions which slope downwardly and inwardly and form a tapering lower portion of the container 25. The frame 14 and container 25 are supported by a pair of wheels 32 and, in general, the grain wagon 12 is constructed similar to the grain wagon disclosed in above mentioned U.S. Pat. No. 5,340,265, the disclosure of which is herein incorporated by reference.

The grain wagon 12 also includes an inclined grain unloading conveyor or auger conveyor assembly 35 which includes an inner portion or section 38 and an outer portion or section 42 pivotally connected at 43 for folding movement of the outer section 42 between a generally horizontal retracted position adjacent the front wall 29 of the container 25 and a forwardly and upwardly and laterally outwardly projecting operating position (FIG. 1) when it is desired to unload grain from the container 25.

Each of the auger conveyor sections 38 and 42 includes a grain confining tubular conduit 44 which encloses a grain moving member or rotary helical screw or flight 46 (FIG. 4) mounted on a center shaft 48. The upper end portion of the shaft 48 is supported by a bearing 51 enclosed within a housing mounted on the upper end of the conduit 44, and an inner or lower end portion of the shaft 48 is connected to a power operated drive such as a hydraulic motor or a shaft connected to the power takeoff of the tow tractor 16, as shown in the above '265 patent. As also disclosed in the '265 patent, the folding of the outer auger section 42 between its stored position and its operating position is produced by a double acting hydraulic cylinder which is connected by hydraulic lines to quick connect hydraulic coupler fittings on the rear of the tow tractor 16 so that the folding movement of the auger conveyor section 42 may be controlled by the tractor operator within the cab 18 by moving one of the hydraulic valve control levers 52.

In accordance with the present invention, the upper end portion of the outer auger conveyor section 42 is provided with a discharge spout assembly 55 through which grain is discharged from the auger unit or assembly 35 when it is desired to transfer grain from the grain wagon container 25 to an open top semi-trailer (not shown) extending adjacent the tow vehicle or tractor 16 and the grain wagon 12. The spout assembly 55 includes box-like fixed spout section 58 (FIG. 3) which is secured or welded to the auger housing or conduit 44 and pivotally supports a moveable spout section 60 by a pair of pivot bolts or pins (not shown) extending through holes 62 within opposite side walls 64 of the moveable spout section 60 and opposite side walls 66 of the spout section 58. The moveable or pivotal spout section 60 also includes a top wall 68 and a bottom wall 69 (FIGS. 4 and 5) which are integrally connected by the side walls 64. A tapered or truncated funnel portion projects from the walls 64, 68 and 69 and defines a grain discharge opening 73.

Figure 4:
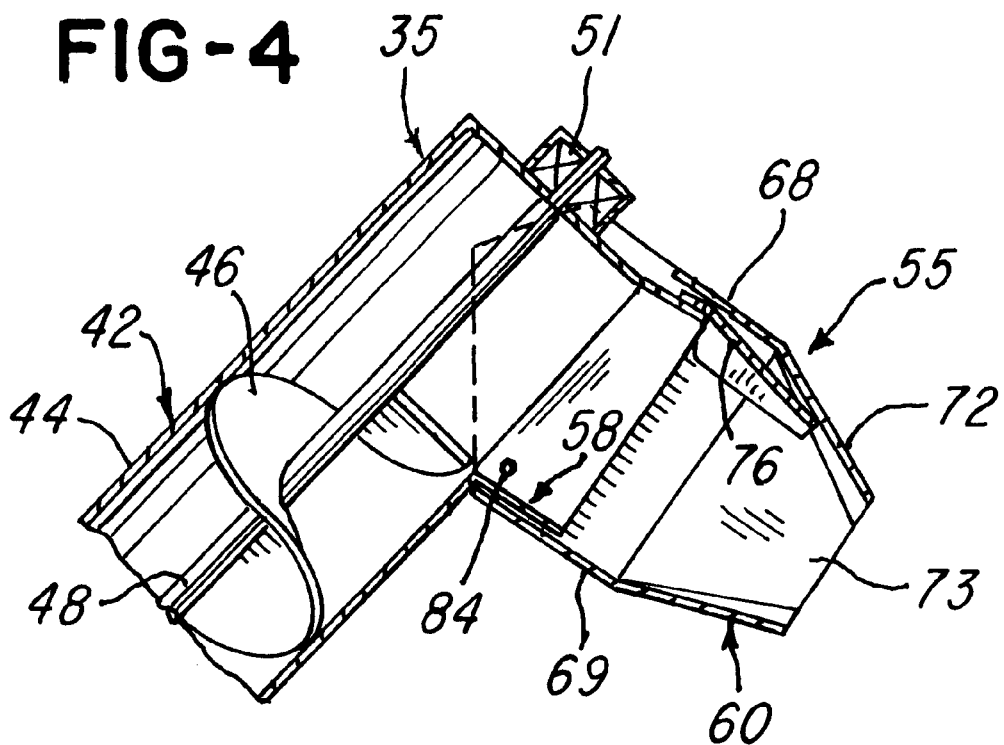
FIG. 4 is a fragmentary vertical section of the auger and discharge spout assembly shown in FIG. 2 and with the spout assembly in its upper position for discharging grain laterally and downwardly.
Figure 5:
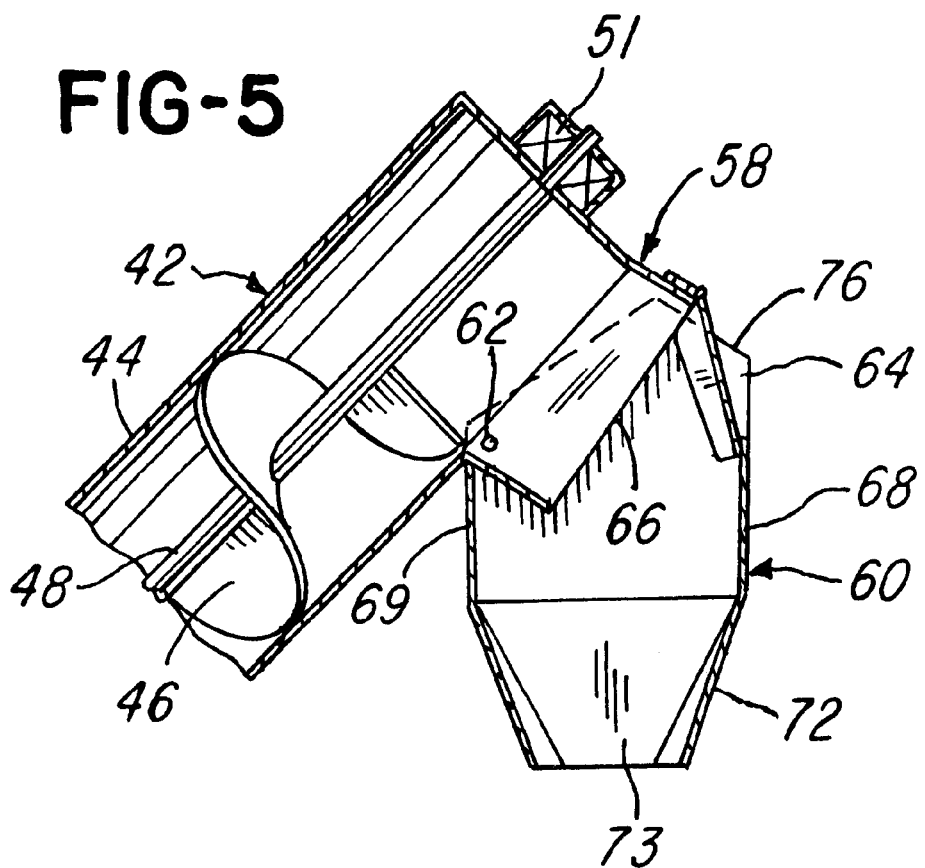
FIG. 5 is a fragmentary section similar to FIG. 4 and showing the spout assembly in its lower position for discharging grain downwardly.

The fixed spout section 58, which is welded to the auger housing 44, also supports a pivotal baffle member 76 (FIG. 3) which is pivotally connected to the top wall of the spout section 58 by a hinge 78. As shown in FIGS. 4 and 5, the outer spout section 60 is moveable or pivotable between an upper position (FIG. 4) for discharging grain laterally outwardly and downwardly and a lower position (FIG. 5) for directing grain straight downwardly from the upper end portion of the auger conveyor section 42. As also shown in FIGS. 4 and 5, when the spout section 60 moves or pivots relative to the spout section 58, the baffle member 76 also pivots. The force of the grain against the baffle member 76 urges the baffle member against the top wall 68 of the spout section 60. The baffle member 76 is also tapered so that it may project into the tapered end portion 72 of the spout section 60 when the spout section 60 is moved to its upper position as shown in FIG. 4.

Figure 2:
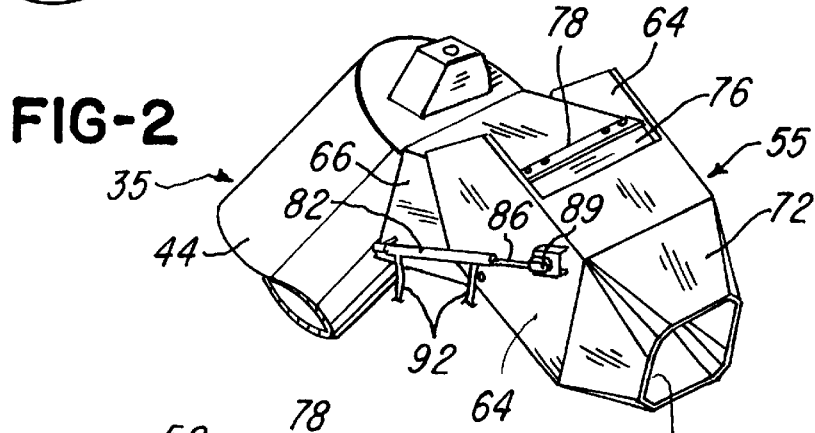
FIG. 2 is a perspective view of the auger discharge spout assembly shown in FIG. 1 and constructed in accordance with the invention.
Figure 3:
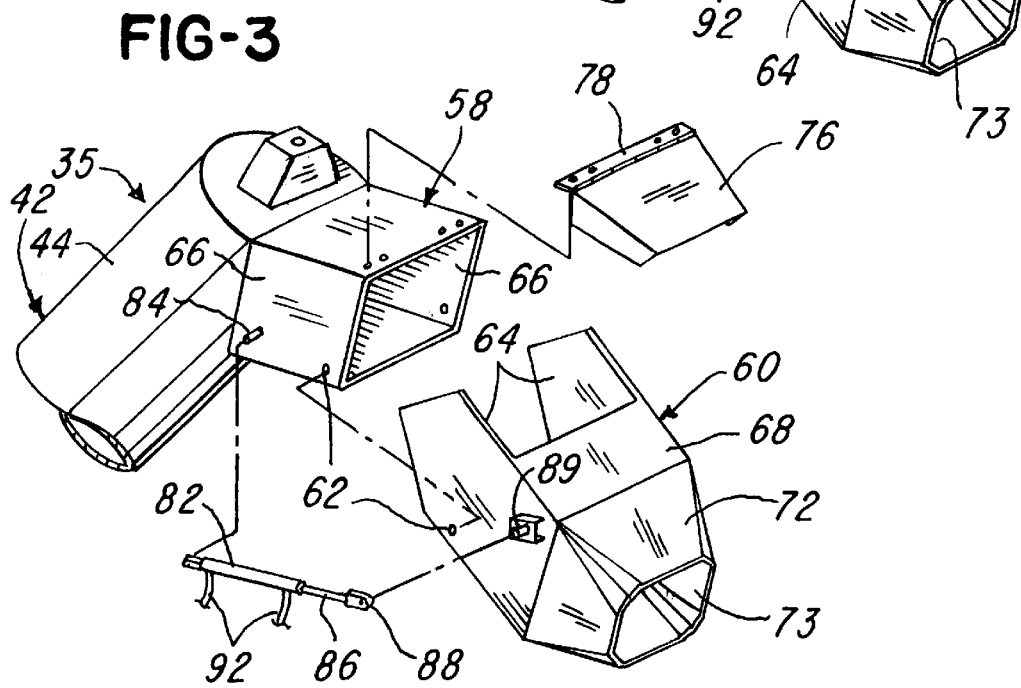
FIG. 3 is an exploded view of the auger discharge spout assembly shown in FIG. 2.

The pivotal movement of the spout section 60 is controlled by an actuator in the form of a double acting hydraulic cylinder 82 (FIG. 2) which is pivotally connected to the spout section 58 by a pivot bolt or pin 84 (FIG. 3). The cylinder 82 has a piston rod 86 which is pivotally connected to the spout section 60 by a fitting 88 and a pivot bolt or pin 89 projecting from a bracket welded to the adjacent side wall 64 of the spout section 60. A pair of power supply or flexible hydraulic conduits or lines 92 extend from the hydraulic cylinder 82 downwardly along the auger conveyor section 42 and then forwardly past the hitch 15 to the hydraulic control quick connect coupler fittings on the back of the tractor 16. Thus when one of the hydraulic valve control levers 52 is actuated by the operator of the tractor 16, the discharge spout 60 positively moves at a controlled rate or speed between its upper and lower positions (FIGS. 4 and 5) when the auger assembly 35 is unloading grain from the container 25 of the grain cart 12.

Referring to FIGS. 6–9 which illustrate another embodiment of the invention, an outer auger conveyor portion or section 42' includes a tubular or cylindrical auger conduit or housing 44' which is attached to an inner auger conveyor portion such as the portion 38, by a pivot connection 43' so that the outer auger conveyor section 42' may be pivoted by a hydraulic cylinder 102 between its operating position (FIG. 1) and a retracted stored position adjacent the front wall of the grain wagon, as described above in connection with FIG. 1. The auger housing 44' encloses a driven helical screw or auger 46' having a center shaft 48', and the outer end of the shaft 48' is rotatably supported by a bearing 104. The bearing is positioned within the center of the housing by four spoke-like rods 106 secured or welded to a cylindrical band 108 mounted within the outer end portion of the tubular housing 44'.

An auger housing extension 110 includes a cylindrical housing 112 which telescopes onto the housing 44' and is supported for axial sliding movement by a plurality of circumferentially spaced and axially extending wear strips 113. The cylindrical housing 112 has a closed outer end wall 114 and a lateral discharge opening which is surrounded by a fixed spout section 58' welded to the housing 112. The fixed housing section 58' pivotally supports a moveable or tiltable spout section 60' which is constructed and supported in the same manner as described above for the spout section 60. Accordingly, the same reference numbers are used for corresponding components of the moveable spout section, but with the addition of a prime mark. As also shown in FIG. 6, 7 and 9, the pivoting of the spout section 60' on the pivot pins 62' is produced by a double acting fluid or hydraulic cylinder 82' which is pivotally connected to the bottom of the housing 112 and has a piston rod 86' pivotally connected to a bracket 118 secured to the bottom of the spout section 60'.

As shown in FIG. 6, the auger housing extension 110 is shifted axially on the auger housing 44' between an extended position (FIG. 6) and a retracted position (not shown) by a double acting hydraulic cylinder 125 mounted on the housing 44'. The cylinder 125 has a piston rod 126 connected to an inner end portion of an actuator rod 128 supported for sliding movement in a tubular guide bushing 130 mounted on the auger housing 44'. The outer end portion of the rod 128 extends between parallel space strips 132 welded to the side of the auger extension housing 112 and is secured to the strips by a pair of bolts 134. The guide rod 128 and the guide bushing 130 prevent the housing 112 from rotating on the housing 44'. The hydraulic cylinder 125 is controlled by hydraulic fluid supplied through flexible hydraulic lines 136 which are connected to the hydraulic fluid lines 138 for the double acting hydraulic cylinder 102.

Thus when the outer auger conveyor section 42' is pivoted from its stored position adjacent the front wall of the grain wagon to its operating position (FIG. 6) by actuating of the cylinder 102 with the valve control 52, the auger housing extension 110 is automatically shifted from its retracted position where the end wall 114 is adjacent the bearing 104 to its extended position (FIG. 6) to provide greater height for the controllable discharge spout 60'. Similarly, when the outer auger conveyor section 42' is pivoted by actuation of the cylinder 102 from its operating position to its retracted stored position, the auger housing extension 110 is automatically shifted to its retracted position. Thus when the auger conveyor section 42' is in its stored position, the auger housing extension 110 and the controllable discharge spout 60' do not project horizontally beyond the right support wheel for the grain wagon.

From the drawings and the above description, it is apparent that a grain wagon having an unloading conveyor or auger with a controllable discharge spout assembly constructed and operated in accordance with the present invention, provides desirable features and advantages. As a primary feature and as mentioned above, as the operator of the tow tractor 16 commences to pull the grain wagon 12 along the side of an open top elongated semi-trailer, the operator moves the auger conveyor section 42 or 42' from its stored position to its extended position. The operator then moves the wagon either slowly or in incremental steps along the length of the semi-trailer while grain is being unloaded by operation of the auger assembly. While unloading grain, the tractor operator also moves a control lever 52 to pivot the spout section 60 or 60' up and down in a controlled manner so that the grain may be selectively directed back and forth across the width of the semi-trailer or wherever grain is needed to fill a space or void in the semi-trailer. As a result, the auger conveyor assembly may be operated at its optimum speed in order to minimize the time required for transferring the grain from the wagon container 25 into the adjacent semi-trailer. The positive and remote control over the pivoting of the spout section 60 or 60' also enables the operator of the tractor to round off or top off the grain across the width of the semi-trailer and uniformly along the length of the semi-trailer and thereby fully load the trailer without requiring another person or that the operator dismount from the tractor 16. As another feature, the automatically extendable and retractable auger housing extension 110 permits the grain to be discharged at a higher elevation above the semi-trailer and provide greater clearance to accommodate higher semi-trailers, but without the stored auger section projecting horizontally beyond a plane defined by the right tire of the grain wagon.

While the forms of grain wagon and their method of use herein described constitute preferred embodiments of the invention, it is to be understood that the invention is not limited to these precise grain wagons and methods described, and that changes may be made therein without departing from the scope and spirit of the invention as defined in the appended claims.

What is claimed is:

1. In a grain wagon pivotally connected to a tow tractor for transferring grain from a field to an open-top semi-trailer, said wagon including a wheel supported frame having a hitch pivotally connecting said frame to said tractor, a container supported by said frame for receiving a volume of grain, an elongated auger conveyor including a motor driven auger with a helical flight within a tubular auger housing and having a lower portion and an upper portion, said lower portion of said auger conveyor mounted on said wagon and positioned to receive grain from said container, said upper portion of said auger conveyor supported for folding movement between a retracted stored position adjacent said container and an operating position projecting upwardly and laterally outwardly from said container, a first hydraulic cylinder connected to pivot said upper portion of said auger conveyor between said stored and operating positions, the improvement wherein said tubular housing for said upper portion of said auger conveyor supports a tubular auger housing extension for telescopic axial movement between a retracted position and an extended position, said auger housing extension having a discharge outlet, a grain directing flow control member supported by said housing extension adjacent said outlet for tilting movement on a generally horizontal axis between an upper position and a lower position relative to said housing extension, a second hydraulic cylinder connected to tilt said flow control member between said upper and lower positions, a third hydraulic cylinder connected to move said auger housing extension on said auger housing between said retracted and extended positions, flexible hydraulic fluid supply lines extending from said second and third hydraulic cylinders along said auger conveyor and said frame and forwardly across said hitch to said tractor, said flexible fluid supply lines providing for pivoting said upper portion of said auger conveyor between said stored and operating positions and for pivoting said grain wagon relative to said tractor, and a manual control valve on said tractor and connected to said lines to enable the driver to control the extension and retraction of said auger housing extension and to tilt said flow control member while pulling said grain wagon along one side of the semi-trailer with said tractor for efficiently and uniformly filling and topping off the semi-trailer with grain.

2. A grain wagon and tow vehicle as defined in claim 1 wherein said first and third hydraulic cylinders are connected to operate together in response to operation of said control valve on said tow tractor to effect axial movement of said housing extension with the pivoting of said upper portion of said auger conveyor.

3. A grain wagon and tow vehicle as defined in claim 1 wherein said flow control member includes inwardly converging walls forming a funnel portion having a discharge opening smaller than said discharge outlet for directing a controlled stream of grain into the semi-trailer.

4. A grain wagon and tow vehicle as defined in claim 3 wherein said flow control member includes a baffle member extending between said discharge outlet and said flow control member and supported for pivotal movement on a generally horizontal axis to provide for a smooth flow of grain through said member while said flow control member is tilted between said upper and lower positions.

5. A grain wagon and tow vehicle as defined in claim 1 and including a bearing member with outwardly projecting spoke members mounted on said auger housing of said upper portion of said auger conveyor and within said auger housing extension to support an upper end portion of said auger for rotation, and said spoke members defining openings therebetween for grain to flow from said auger housing into said auger housing extension.

* * * * *